(12) United States Patent
Kogure et al.

(10) Patent No.: US 11,397,603 B2
(45) Date of Patent: Jul. 26, 2022

(54) INFORMATION PROCESSING APPARATUS, CONTROL METHOD THEREFOR, AND PROGRAM

(71) Applicant: CANON KABUSHIKI KAISHA, Tokyo (JP)

(72) Inventors: Takeshi Kogure, Toride (JP); Yoshihiro Tsukada, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/752,720

(22) PCT Filed: Sep. 1, 2016

(86) PCT No.: PCT/JP2016/076358
§ 371 (c)(1),
(2) Date: Feb. 14, 2018

(87) PCT Pub. No.: WO2017/047476
PCT Pub. Date: Mar. 23, 2017

(65) Prior Publication Data
US 2019/0042291 A1  Feb. 7, 2019

(30) Foreign Application Priority Data
Sep. 16, 2015 (JP) .............................. JP2015-183180

(51) Int. Cl.
*G06F 9/455* (2018.01)
*G06F 9/48* (2006.01)

(52) U.S. Cl.
CPC ........ *G06F 9/45558* (2013.01); *G06F 9/4843* (2013.01); *G06F 9/4881* (2013.01); *G06F 2009/4557* (2013.01)

(58) Field of Classification Search
CPC combination set(s) only.
See application file for complete search history.

(56) References Cited

U.S. PATENT DOCUMENTS 8,826,276 B1 * 9/2014 Li .......................... G06F 9/4843
  709/226
9,128,899 B1 * 9/2015 McAlister ........... G06F 11/2023
(Continued)

FOREIGN PATENT DOCUMENTS

CN   104598298 A   5/2015
CN   104798061 A   7/2015
(Continued)

OTHER PUBLICATIONS

International Search Report issued in Intl. Appln. No. PCT/JP2016/076358 dated Nov. 29, 2016.
(Continued)

*Primary Examiner* — Sisley N Kim
(74) *Attorney, Agent, or Firm* — Rossi, Kimms & McDowell LLP

(57) ABSTRACT

An information processing apparatus which is capable of carrying out asynchronous processes. In an MFP provided with an execution environment in which one thread is allowed to be used at one time regarding use of a thread, when an extension application 207a is started, a VM thread 205a and a VM 203a which uses the VM thread 205a are generated, and further another new VM thread 205b is generated in response to a request from the extension application 207a and a new VM 203b which uses the new VM thread 205b is generated.

19 Claims, 12 Drawing Sheets

(56) References Cited

U.S. PATENT DOCUMENTS

| | | | |
|---|---|---|---|
| 9,444,841 B2 | 9/2016 | Feroz et al. | |
| 2002/0069335 A1* | 6/2002 | FlyInn, Jr. | G06F 3/0619 |
| | | | 711/153 |
| 2008/0148258 A1 | 6/2008 | Regnier | |
| 2010/0333100 A1* | 12/2010 | Miyazaki | G06F 9/4881 |
| | | | 718/103 |
| 2011/0154327 A1* | 6/2011 | Kozat | G06F 9/5077 |
| | | | 718/1 |
| 2012/0023493 A1* | 1/2012 | Mori | G06F 9/45558 |
| | | | 718/1 |
| 2012/0072914 A1* | 3/2012 | Ota | G06F 9/5022 |
| | | | 718/100 |
| 2013/0160011 A1* | 6/2013 | Corrie | G06F 9/45558 |
| | | | 718/1 |
| 2014/0029029 A1* | 1/2014 | Akuzawa | G06K 15/00 |
| | | | 358/1.11 |
| 2015/0089249 A1* | 3/2015 | Hannon | G06F 1/3206 |
| | | | 713/300 |
| 2016/0026488 A1* | 1/2016 | Bond | G06F 9/4552 |
| | | | 718/1 |
| 2016/0055045 A1* | 2/2016 | Souza | G06F 11/079 |
| | | | 714/57 |
| 2016/0103699 A1* | 4/2016 | Thakkar | G06F 9/45558 |
| | | | 718/1 |
| 2016/0139942 A1* | 5/2016 | Tsirkin | G06F 9/45558 |
| | | | 718/1 |

FOREIGN PATENT DOCUMENTS

| | | |
|---|---|---|
| CN | 104823157 A | 8/2015 |
| JP | 2014075088 A | 4/2014 |
| WO | 2014126574 A1 | 8/2014 |

OTHER PUBLICATIONS

Written Opinion issued in Intl. Appln. No. PCT/JP2016/076358 dated Nov. 29, 2016.

Ierusalimschy. "Programming in Lua." ASCII Media Works. Aug. 31, 2009: 325 and 330. Japan. Cited in NPL 1 and NPL 2. Partial English translation provided.

"Effective Game Development with Scripting Language." Softbank Creative, Inc. Oct. 5, 2010: 184-185. Japan. Cited in NPL 1 and NPL 2. Partial English translation provided.

Office Action issued in Indian Appln. No. 201847013119 dated Sep. 28, 2020.

Office Action issued in Chinese Appln. No. 201680052887.6 dated Mar. 2, 2021. English translation provided.

* cited by examiner

| APPLICATION ID | THREAD ID | QUEUE ID |
|---|---|---|
| APPLICATION A | VM THREAD 1 | QUEUE 1 |
| APPLICATION A | VM THREAD 2 | QUEUE 2 |
| APPLICATION B | VM THREAD 3 | QUEUE 3 |

| EXECUTION FILE | EXECUTION FUNCTION | PRIORITY LEVEL | STACK SIZE |
|---|---|---|---|
| file1 | funcA | 10 | 1024 |

NOW OBTAINING IMAGE

CANCEL

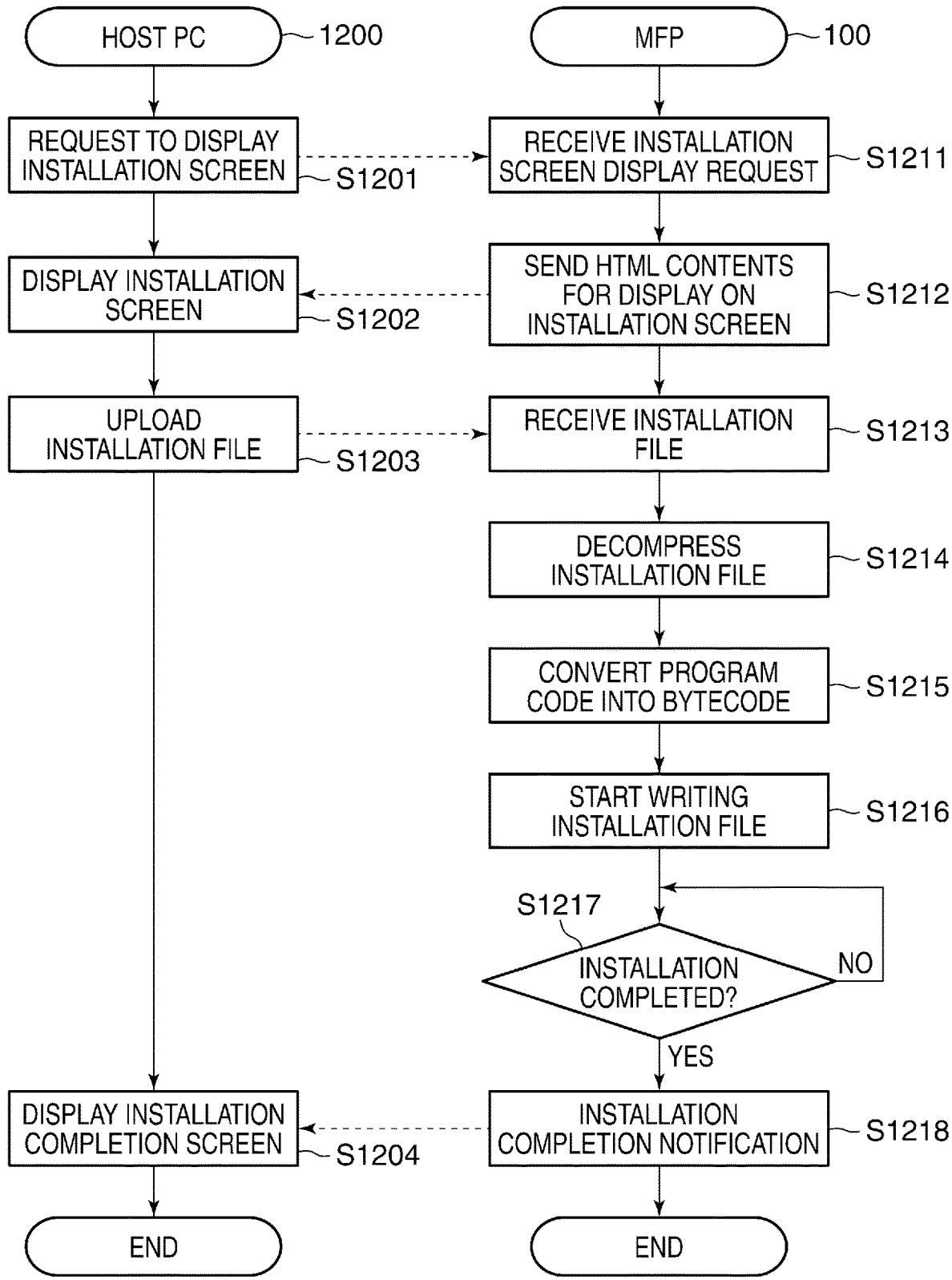

INFORMATION PROCESSING APPARATUS, CONTROL METHOD THEREFOR, AND PROGRAM

TECHNICAL FIELD

The present invention relates to an information processing apparatus, a control method therefor, and a program, and relates to, for example, an information processing apparatus that carries out asynchronous processes, a control method therefor, and a program.

BACKGROUND ART

There are known image forming apparatuses as information processing apparatuses onto which extension programs are installed as add-ins so as to extend functions. Such image forming apparatuses have an execution environment for executing extension programs as well as an execution environment for executing control programs aimed at implementing basic functions.

Specifically, in an image forming apparatus, control programs for controlling a printer unit, a facsimile unit, and a scanner unit of the image forming apparatus and an extension program execution platform which is an execution environment for executing extension programs run on an operating system (OS). An extension program system service and an extension program run on the extension program execution platform (see, for example, Patent Literature 1).

CITATION LIST

Patent Literature

{PTL 1} Japanese Laid-Open Patent Publication (Kokai) No. 2014-75088

SUMMARY OF INVENTION

Technical Problem

In a case where a printing process in which image data stored in an external apparatus is obtained and printed by executing an extension program is carried out, a process to communicate with the external apparatus and a user interface (UI) process may be asynchronously carried out. In order to asynchronously carry out the communication process and the UI process, that is, in order to carry out asynchronous processes, it is necessary to use a plurality of threads in an extension program on an OS.

However, in an execution environment where threads and other functions are used, if one thread is allowed to be used at one time, it is impossible to carry out asynchronous processes.

The object of the present invention is to provide an information processing apparatus which is capable of carrying out asynchronous processes, a control method therefor, and a program.

Solution to Problem

To accomplish the above object, in a first aspect of the present invention, there is provided an information processing apparatus comprising execution means for executing a plurality of virtual machines each of which is provided separately from an OS, is a program interpreting and executing a command included in an extension program, and is allowed to use one thread at one time regarding use of a thread, and control means for controlling a process in which communications between a thread for one virtual machine executed by the execution means, and a thread for another virtual machine different from the one virtual machine are carried out using a native program which runs on the OS.

To accomplish the above object, in a second aspect of the present invention, there is provided a control method for an information processing apparatus comprising an execution step of executing a plurality of virtual machines each of which is provided separately from an OS, is a program interpreting and executing a command included in an extension program, and is allowed to use one thread at one time regarding use of a thread, and a control step of controlling a process in which communications between a thread for one virtual machine executed is the execution step, and a thread for another virtual machine different from the one virtual machine are carried out using a native program which runs on the OS.

To accomplish the above object, in a third aspect of the present invention, there is provided control program for causing a computer to perform an execution step of executing a plurality of virtual machines each of which is provided separately from an OS, is a program interpreting and executing a command included in an extension program, and is allowed to use one thread at one time regarding use of a thread, and a control step of controlling a process in which communications between a thread for one virtual machine executed is the execution step, and a thread for another virtual machine different from the one virtual machine are carried out using a native program which runs on the OS.

Advantageous Effects of Invention

According to the present invention, it is possible to carry out asynchronous processes.

BRIEF DESCRIPTION OF DRAWINGS

FIG. 4 is a diagram useful in explaining an exemplary arrangement of thread management information generated in step S304 in FIG. 3.

FIG. 6 is a diagram useful in explaining an exemplary arrangement of thread information which is sent in step S501 in FIG. 5.

FIG. 9 is a view showing an exemplary operating screen displayed in step S803 in FIG. 8.

FIG. 12 is a diagram useful in explaining the flow of a process in which an extension application stored in a host PC which is an external apparatus is installed in the MFP.

DESCRIPTION OF EMBODIMENTS

The present invention will now be described in detail with reference to the drawings showing preferred embodiments thereof.

Further features of the present invention will become apparent from the following description of exemplary embodiments (with reference to the attached drawings).

First, a description will be given of a comparative example of the present invention. For example, in a case where a printing process in which image data stored in an external apparatus is obtained and printed by executing an extension program is carried out, a process to communicate with the external apparatus and a user interface (UI) process may be carried out asynchronously. In this case, the UI process is suspended while the process to communicate with the external apparatus is in execution, and hence if the process to communicate with the external apparatus takes long for some reason, the UI process is not carried out, and an input through a UI or the like cannot be received as needed. To cope with this, in a printing process, the communication process and the UI process are usually carried out asynchronously. Accordingly, the UI process is not suspended even while the external apparatus communication process is in execution, and hence even when any trouble occurs during the communication process, the UI process is carried out. As a result, an input through a UI or the like is received as needed.

To carry out the communication process and the UI process asynchronously, that is, to carry out asynchronous processes, it is necessary to use a plurality of OS threads in an extension program. Here, in an image forming apparatus allowed to be equipped with an execution environment with leeway according to the comparative example of the present invention, for example, an execution environment in which Java (registered trademark) is allowed to be used, a virtual machine (VM) that executes extension programs is allowed to use a plurality of OS threads. As a result, it is possible to carry out asynchronous processes in an image forming apparatus that is allowed to be equipped with an execution environment having leeway.

Next, embodiments of the present invention will be described in detail with reference to the drawings. In the following description of the embodiments, it is assumed that the invention is applied to an image forming apparatus such as an MFP (multifunctional peripheral) which is an information processing apparatus. The present invention, however, may also be applied to a printer which is an image forming apparatus and further to an information processing apparatus with no image forming function, for example, a server, a PC, or a smart electrical household appliance. Specifically, the present invention may be applied to any information processing apparatuses as long as they are installed with an extension program as an add-in to carry out asynchronous processes.

First, a description will be given of a first embodiment of the present invention.

Figure 1:
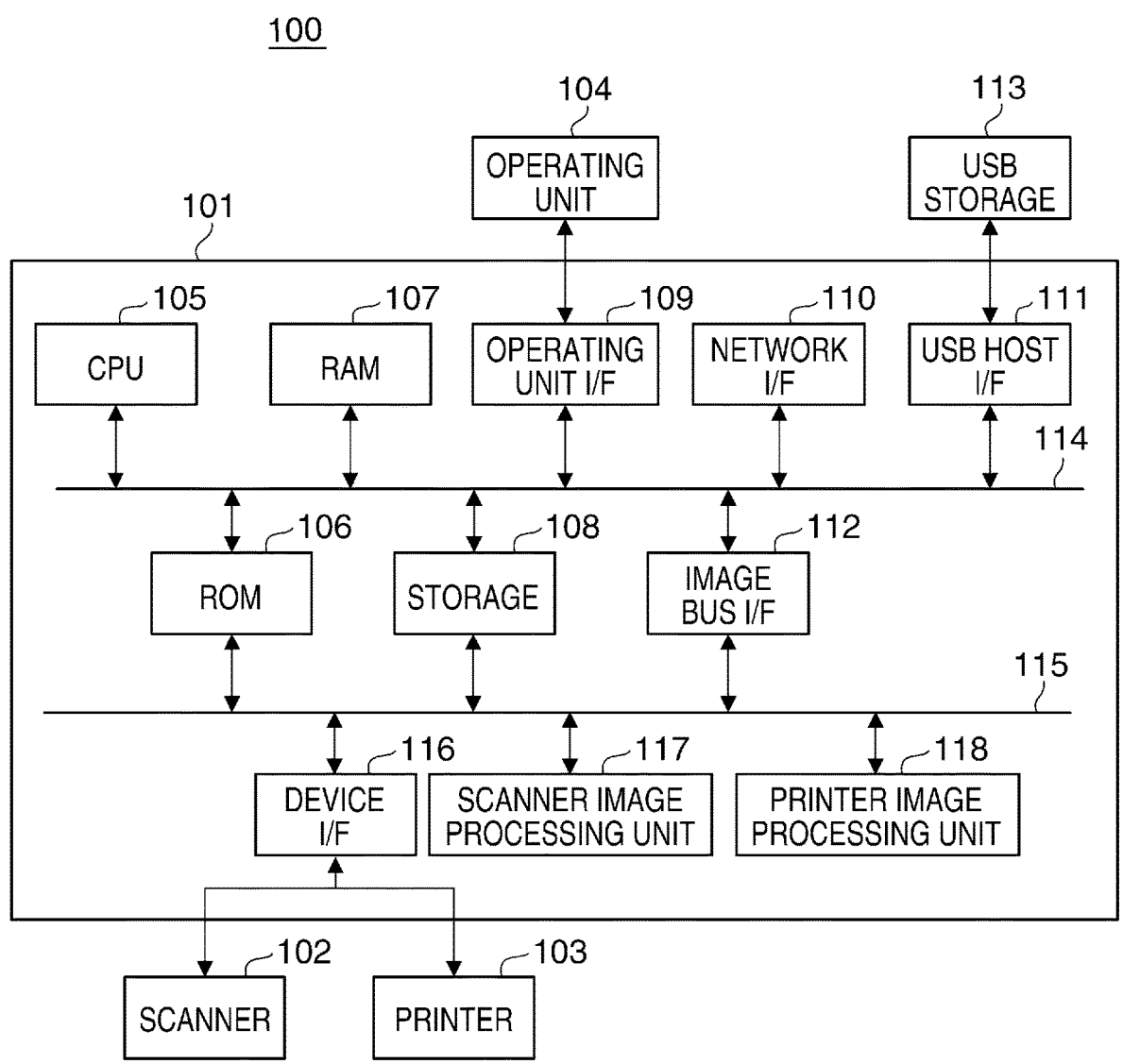
FIG. 1 is a block diagram schematically showing an arrangement of an essential part of an MFP which is an information processing apparatus according to embodiments of the present invention.

FIG. 1 is a block diagram schematically showing an arrangement of an essential part of an MFP which is an information processing apparatus according to the present embodiment. In the present embodiment, it is assumed that the MFP 100 is equipped with only an execution environment that has little margin, for example, an execution environment using Lua, and a VM which can use threads and other functions is allowed to use one thread at one time regarding use of a thread.

Referring to FIG. 1, the MFP 100 has a controller unit 101, and not only a scanner 102, which is an image input device, and a printer 103, which is an image output device are connected to the controller unit 101, but also an operating unit 104 is connected thereto. The controller unit 101 provides control to implement a copy function of causing the printer 103 to print out image data read by the scanner 102. The controller unit 101 also has a CPU 105, a ROM 106, a RAM 107, and a storage 108, and the CPU 105 starts an OS using a boot program stored in the ROM 106. The CPU 105 carries out a variety of processes by executing programs, which are stored in the storage 108, on the started OS. The RAM 108 offers a work area for the CPU 105 and also offers an image memory area for temporarily storing image data. The storage 108 stores programs and image data.

The controller unit 101 also has an operating unit I/F (operating unit interface) 109, a network I/F (operating interface) 110, a USB host I/F 111, and an image bus I/F (image bus interface) 112. Not only the ROM 106, the RAM 107, and the storage 108 but also the operating unit I/F 109, the network I/F 110, the USB host I/F 111, and the image bus I/F 112 are connected to the CPU 105 via a system bus 114. The operating unit I/F 109 is an interface to the operating unit 104, which has a touch panel, and outputs image data, which is to be displayed on a screen of the operating unit 104, to the operating unit 104. The operating unit I/F 109 sends information, which is input on the operating unit 104 by a user, to the CPU 105. The network I/F 110 is an interface for connecting the MFP 100 to a LAN. The USB host I/F 111 is an interface for communicating with a USB storage 113 that is an external storage device in which data is stored, and sends data stored in the storage 108 to the USB storage 113 so that the data can be stored in the USB storage 113. The USB host I/F 111 also receives data stored in the USB storage 113 and transfers the received data to the CPU 105. The USB storage 113 is removable from the USB host I/F 111. It should be noted that a plurality of USB devices including the USB storage 113 is connectable to the USB host I/F 111. The image bus I/F 112 is a bus bridge that connects the system bus 114 and an image bus 115, which transfers image data at high speed, to each other and performs data format conversion. The image bus 115 is comprised of a PCI bus, an IEEE 1394, or the like. A device i/F 116, a scanner image processing unit 117, and a printer image processing unit 118 are connected to the image bus 115. The scanner 102 and the printer 103 are connected to the device i/F 116, and the device i/F 116 performs synchronous or asynchronous conversion on image data. The scanner image processing unit 117 corrects, processes, or edits input image data. The printer image processing unit 118 performs correction, resolution conversion, and so forth appropriate to the printer 103 on output image data.

Figure 2:
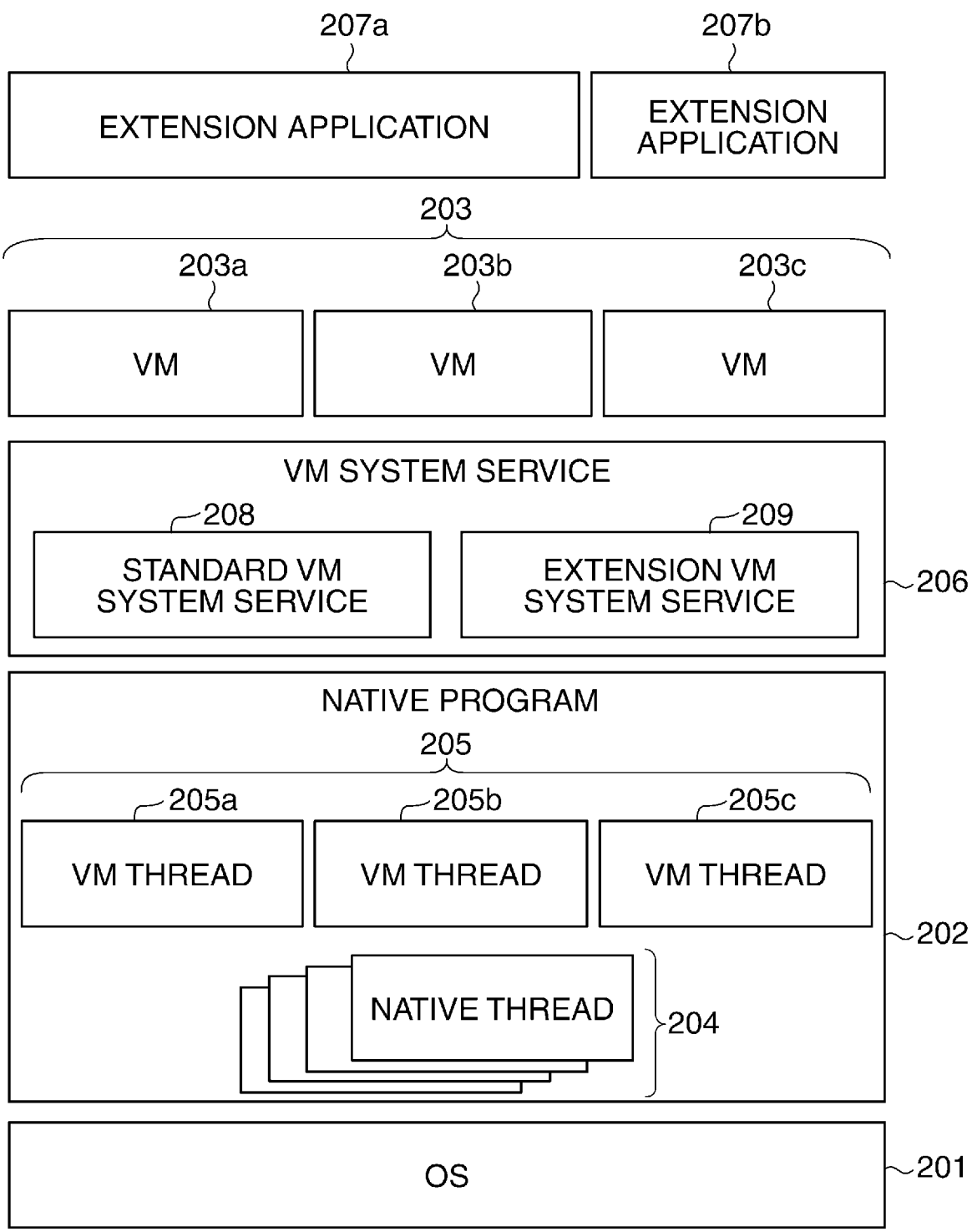
FIG. 2 is a block diagram useful in explaining an exemplary execution environment for an extension application in the NFP appearing in FIG. 1.

FIG. 2 is a block diagram useful in explaining an exemplary execution environment for an extension application (extension program) in the MFP appearing in FIG. 1. In the present embodiment, modules in FIG. 2 described hereafter are implemented on the OS by the CPU 105 loading a program, which is stored in the storage 108, into the RAM 107 and executing the same.

Referring to FIG. 2, a native program 202, which is for implementing a printer function, a FAX function, and a scanner function, and VMs 203 are running on an OS 201 started by the CPU 105. The VMs 203 are modules that interpret and execute programs that control extension applications, and extension applications always run on the VMs 203. In the native program 202, there are native threads 204 for controlling image processing units such as the printer 103 and the scanner 102, and VM threads 205 for running the VMs 203. In the present embodiment, three VMs i.e. a VM 203a, a VM 203b, and a VM 203c are generated as the VMs 203. Also, three VM threads i.e. a VM thread 205a, a VM thread 205b, and a VM thread 205c for the VM 203a, the VM 203b, and the VM 203c are correspondingly generated as the VM threads 205. A VM system service 206 is a utility library which is commonly used by extension applications 207a and 207b and offers a plurality of functions. The extension applications 207a and 207b select functions required to execute themselves from the VM system service 206. In the MFP 100, functions offered by the VM system service 206 are called from the extension applications 207a and 207b, and this saves burden of having to develop extension applications and further enables access to the modules of the MFP 100. The VM system service 206 has a standard VM system service 208 and an extension VM system service 209 as modules. The standard VM system service 208 offers basic services of a file system, such as "open", "close", "read", and "write", and implements minimum necessary functions for the VMs 203 to function as VMs. The extension VM system service 209 implements a function of accessing the modules of the MFP 100 and functions of the OS.

The VMs 203 interpret and execute the extension applications 207a and 207b. The VMs 203 are generated for respective threads of extension applications. In the execution environment shown in FIG. 2, the two VM threads 205a and 205b are generated for the extension application 207a that carries out asynchronous processes, and the two VMs 203a and 203b are generated for the respective VM threads 205a and 205b. The one VM threads 205c is generated for the extension application 207b that carries out synchronous processes, and the one VMs 203c is generated for the VM thread 205c.

Referring again to FIG. 1, icons that represent the extension applications 207a and 207b are displayed on a screen on the operating unit 104 of the MFP 100. Upon detecting selection of any icon by a user via the operating unit 104, the operating unit I/F 109 sends the CPU 105 a notification to that effect. Upon receiving the notification to that effect, the CPU 105 starts the extension application 207a or the extension application 207b selected by the user.

Figure 3:
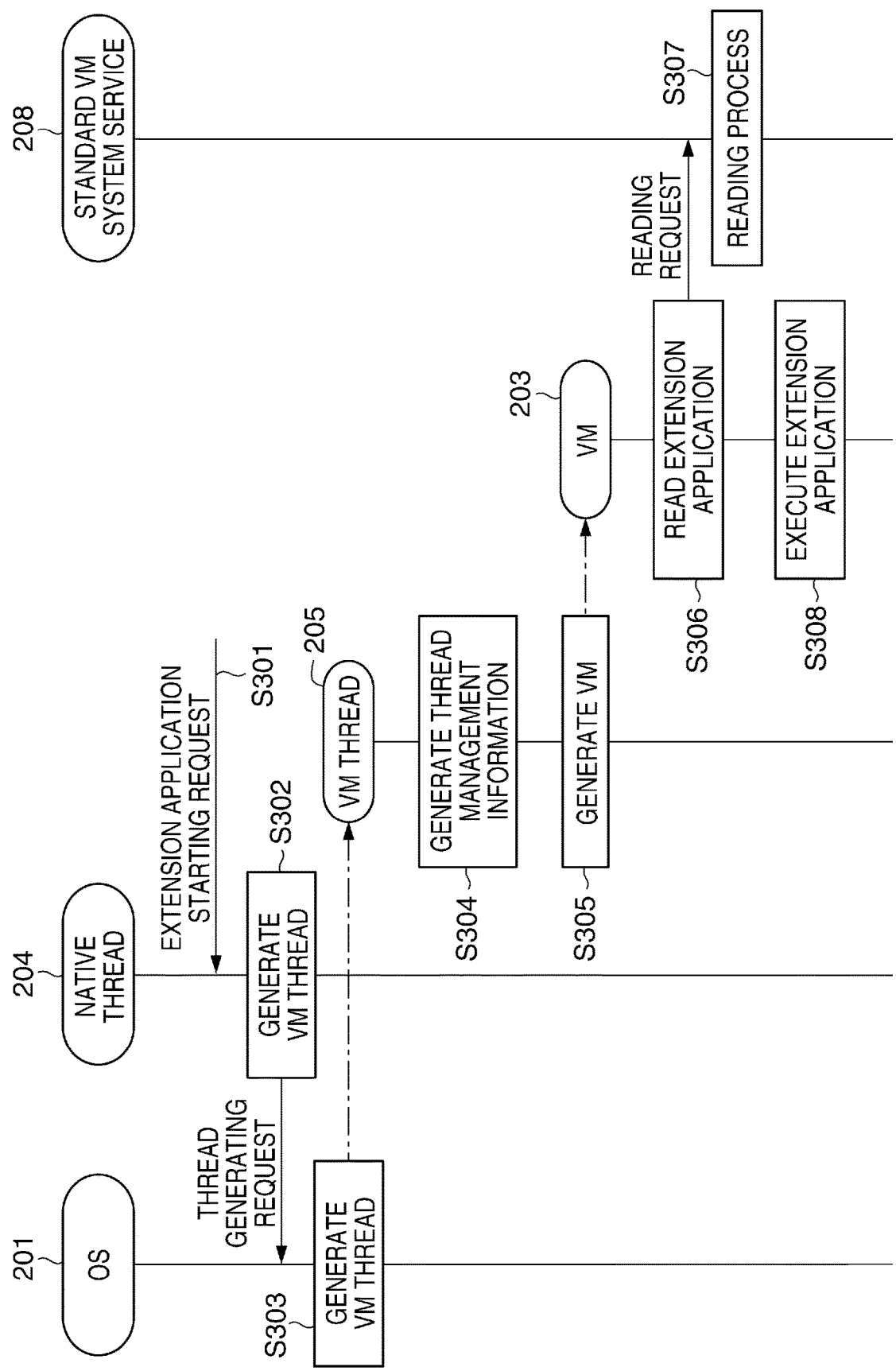
FIG. 3 is a diagram useful in explaining the flow of a process in which an extension application is started on the OS appearing in FIG. 2.

FIG. 3 is a diagram useful in explaining the flow of a process in which an extension application is started on the OS appearing in FIG. 2.

First, the native thread 204 is notified of an extension application starting request (step S301), and next, in step S302, the native thread 204 carries out a VM thread generating process. At this time, the native thread 204 sends a VM thread generating request to the OS 201. In response to the thread generating request, the OS 201 (thread generating means) generates the VM thread 205 (step S303). Then, the generated VM thread 205 (virtual machine generating means, thread management information generating means) generates thread management information 400 (see FIG. 4), to be described later, and also generates the VM 203 which is to run on (use) the VM thread 205 (step S305). The generated VM 203 executes reading of an extension application and sends a reading request to the standard VM system service 208 (step S306). In response to the reading request, the standard VM system service 208 causes the VM 203 to read data for executing the extension application (hereafter referred to as "extension application data") (step S307). Then, the VM 203 executes the extension application based on the extension application data that has been read (step S308). Namely, in the process in FIG. 3, when an extension application is to be started, the new VM thread 205 different from the native thread 204 is generated, and further, the VM 203 using the VM thread 205 is generated.

FIG. 4 is a diagram useful in explaining an exemplary arrangement of thread management information which is generated in the step S304 in FIG. 3.

The thread management information 400 is used to manage the VM threads 205 which is generated when an extension application is started. The thread management information 400 has application IDs 401, thread IDs 402, and queue IDs 403. The application IDs 401 are identification numbers for identifying applications associated with the generated VM threads 205. The thread IDs 402 are identification numbers for identifying the respective VM threads 205. The queue IDs 403 are identification numbers for identifying queues in which messages associated with the respective VM threads 205 are stored. In the exemplary arrangement of thread management information in FIG. 4, a VM thread 1 which is for an application A and a queue ID of which is 1, and a VM thread 2 which is for the application A and a queue ID of which is 2 are generated. Further, a VM thread 3 which is for the application B and a queue ID of which is 3 is generated.

Figure 5:
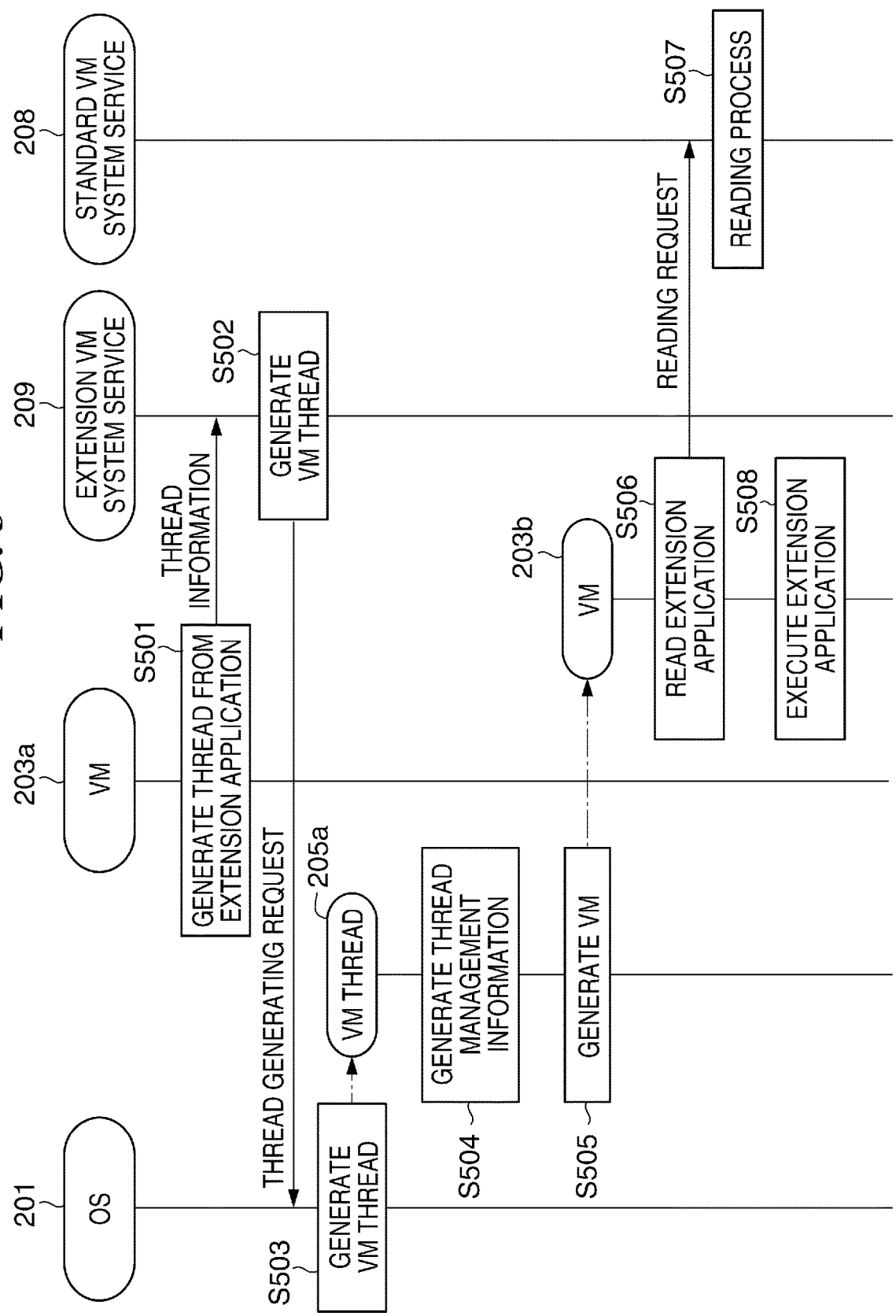
FIG. 5 is a diagram useful in explaining the flow of a process in which a new VM thread is generated from an extension application on the OS appearing in FIG. 2.

FIG. 5 is a diagram useful in explaining the flow of a process in which a new VM thread is generated from an extension application on the OS in FIG. 2. It is assumed that when the process in FIG. 5 is executed, the process in FIG. 3 has been carried out to generate the VM thread 205a and the VM 203a.

First, in response to a request from the extension application 207a, the VM 203a carries out a thread generating process (step S501) and sends a thread generating request, which requests generation of a new VM thread 205 (205b), to the extension VM system service 209. At this time, thread information 600 in FIG. 6 is sent as the thread generating request. The thread information 600 indicates information 601 on an execution file for the extension application 207b which is executed after generation of the new VM thread 205b, and information 602 on an execution function which is executed by the extension application 207b. Further, the thread information 600 indicates information 603 on a priority level of the VM thread 205b, and information 604 on a stack size of the VM thread 205b.

Referring again to FIG. 5, the extension VM system service 209 that has received the thread information 600 carries out a VM thread generating process and sends a thread generating request to the OS 201 (step S502). The thread generating request sent in the step S502 requests generation of the VM thread 205b which has a resource appropriate to the information 603 on the priority level in the thread information and the information 604 on the stack size. Then, the OS 201 generates the VM thread 205b appropriate to the priority level and the stack size requested in the thread generating request (step S503). The generated VM thread 205b generates thread management information 400 (step S504) and further generates a new VM 203b which is to run on (use) the VM thread 205b (step S505). Then, the generated VM 203b executes reading of an extension application and sends a reading request to the standard VM system service 208 (step S506). In response to the reading request, the standard VM system service 208 causes the VM 203b to read extension application data (step S507). Specifically, the standard VM system service 208 causes the VM 203b to read a file designated by the information 601 on the execution file in the thread information 600. The VM 203b then executes the extension application based on the extension application data that has been read (step S308). Specifically, the VM 203b executes a function designated by the information 602 on the execution function in the thread information 600.

According to the process in FIG. 5, the new VM thread 205b different from the VM thread 205a is generated in response to execution of the extension application 207b, and further, the new VM 203b using the new VM thread 205b is generated. Thus, it is possible to substantially use a plurality of threads (the VM thread 205a and the VM thread 205b). As a result, it is possible to carry out asynchronous processes even in a tight execution environment in which a VM is allowed to use one thread at one time regarding use of a thread.

Figure 7:
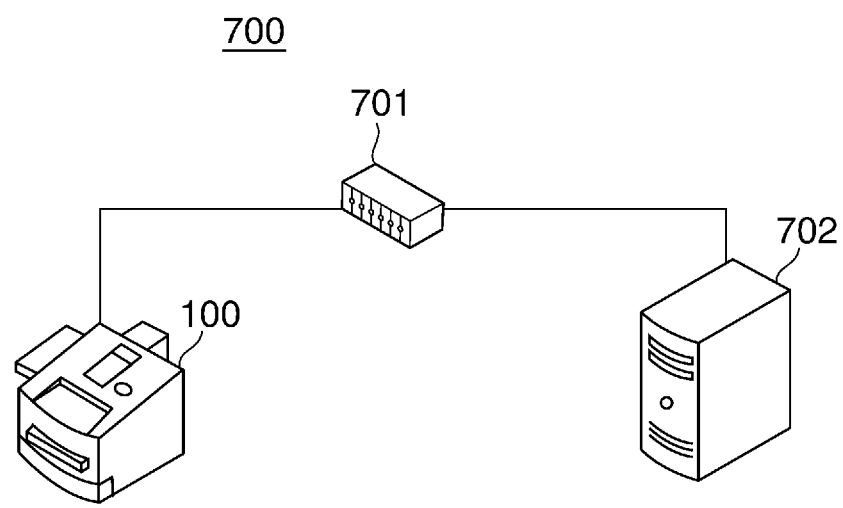
FIG. 7 is a view useful in explaining an exemplary device arrangement of a printing system including the MFP in FIG. 1.

FIG. 7 is a view useful in explaining an exemplary device arrangement of a printing system including the MFP in FIG. 1.

Referring to FIG. 7, a printing system 700 has the MFP 100, a network router 701, and an external apparatus 702. An extension application for obtaining and printing image data stored in the external apparatus 702 is installed on the MFP 100. The network router 701 mediates communication between the MFP 100 and the external apparatus 702. The external apparatus 702 stores image data, and in response to an image obtaining request from the MFP 100, sends image data to the MFP 100. It should be noted that the external apparatus 702 may be present on either an intranet or the Internet.

Figure 8:
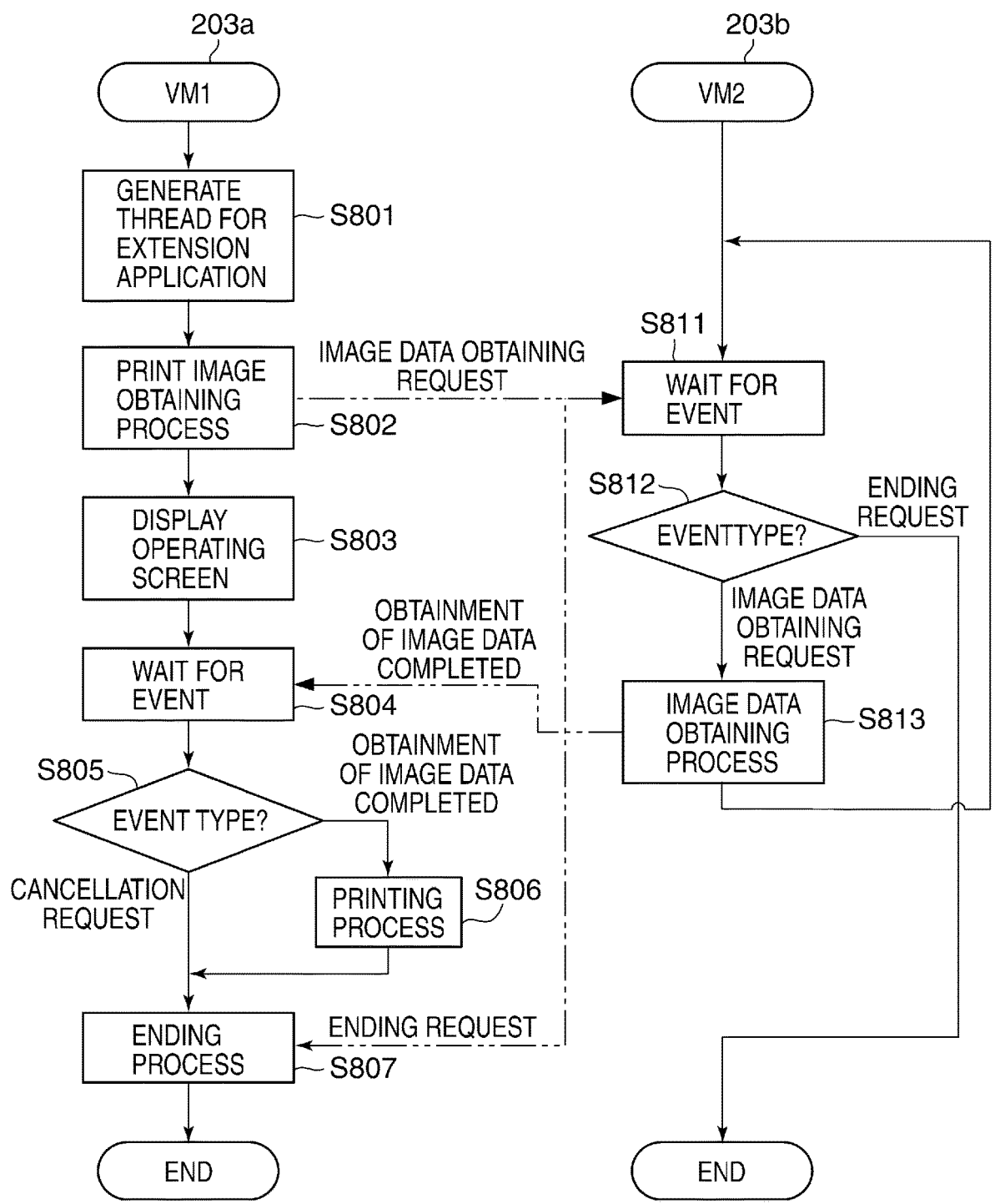
FIG. 8 is a diagram useful in explaining the flow of a process in which an extension application for obtaining and printing image data stored in the external apparatus appearing in FIG. 7 is executed.

FIG. 8 is a diagram useful in explaining the flow of a process in which an extension application for obtaining and printing obtain image data stored in the external apparatus in FIG. 7 is executed. It is assumed that when the process in FIG. 8 is executed, the process in FIG. 3 has been carried out to generate the VM thread 205a and the VM 203a.

First, the VM 203a carries out the process in FIG. 5 to generate the VM thread 205b in response to execution of an extension application and further generates the VM 203b (step S801). The VM 203b uses the generated VM thread 205b as a thread for use in a process for obtaining image data. Next, the VM 203a carries out a print image obtaining process in which it requests the VM 203b to obtain image data (step S802) and carries out an operating screen display process in which it displays an operating screen appearing in FIG. 9 (step S803). Further, the VM 203a carries out an event waiting process in which it waits for an event from another thread (step S804). Then, upon receiving some event, the VM 203a determines a type of the received event (step S805). As a result of the determination in the step S805, when the received event indicates that obtainment of image data has been completed, the process proceeds to step S806, in which a printing process is carried out to print the obtained image data. When the received event indicates a cancellation request, the VM 203a carries out an ending process in which it sends an ending request to the VM 203b (step S807), and after that, the VM 203a ends the process.

As a result of the execution in the step S801, the generated VM 203b carries out an event waiting process in which it waits for an event from another thread (step S811), and upon receiving some event, the VM 203b determines a type of the received event (step S812). As a result of the determination in the step S812, when the received event indicates an ending request, the VM 203b ends the process. When the received event indicates an image data obtaining request, the process proceeds to the step S813, and the VM 203b carries out an image data obtaining process in which it obtains image data from the external apparatus 702, and after completing the obtainment of the image data, sends an image obtainment completion notification to the VM 203a. After that, the VM 203b returns the process to the step S811.

Figure 10:
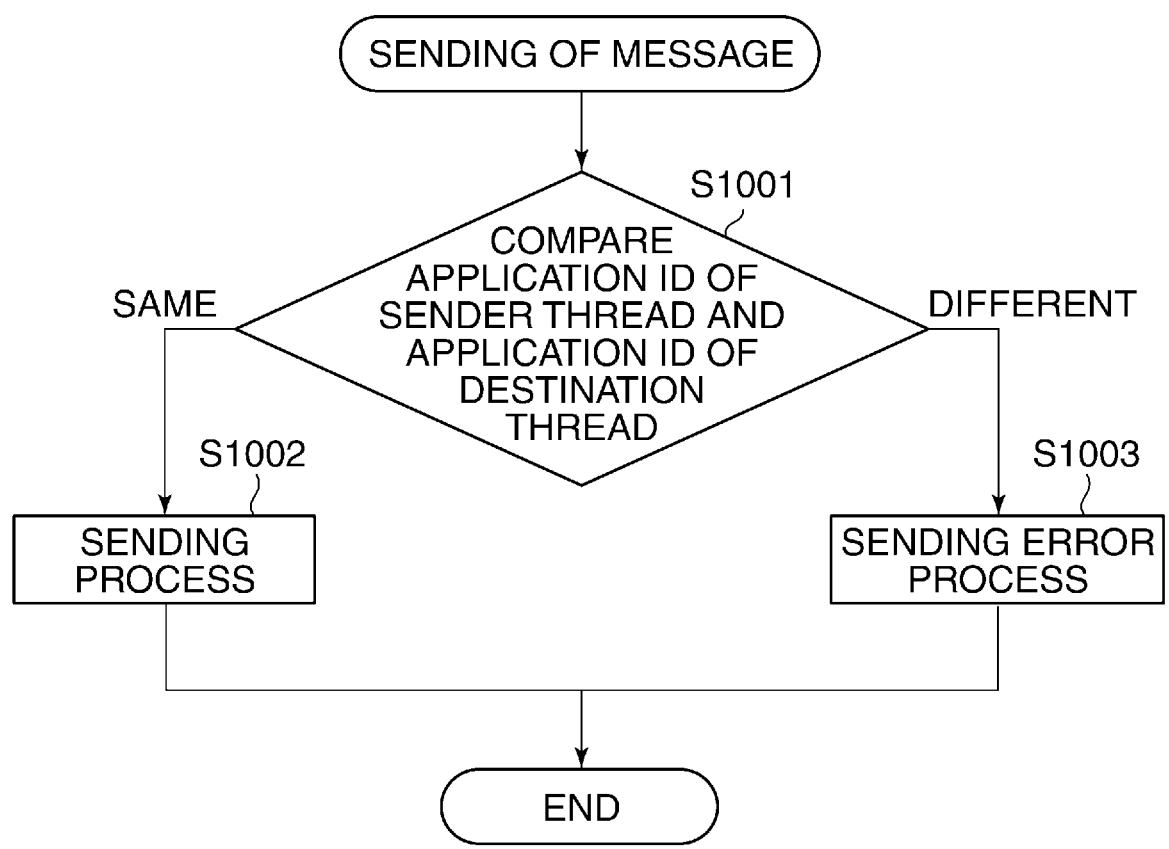
FIG. 10 is a diagram useful in explaining a message sending process which is carried out between two VMs in step S802 and step S813 in FIG. 8.

FIG. 10 is a diagram useful in explaining a message sending process which is carried out between the two VMs in the step S802 and the step S813 in FIG. 8.

First, the VM 203a and the VM 203b (message sending means) refer to the thread management information 400. Next, the VM 203a and the VM 203b compare an identification number of an application for a VM thread which is a sender and an identification number of an application for a VM thread which is a destination with each other (step S1001). For example, in the step S802, an identification number of an application for the VM thread 205a used by the VM 203a which is a sender and an identification number of an application for the VM thread 205b used by the VM 203b which is a destination are compared with each other. As a result of the determination in the step S1001, when the identification numbers of the two applications compared with each other are the same, the VM 203a and the VM 203b carry out a sending process in which they send a message (step S1002). In the sending process in the step S1002, the queue ID 403 of the destination is obtained from the thread management information 400, a message is stored in a queue corresponding to the obtained queue ID 403, and this queue is sent. For example, in the step S802, the VM 203a stores an "image data obtaining request" as a message in a queue and sends this queue to the VM 203b. After that, the VM 203a and the VM 203b end the process. As a result of the determination in the step S1001, when the identification numbers of the two applications compared with each other are different, the VM 203a and the VM 203b carry out a sending error process in which they indicate an error on, for example, a screen of the operating unit 104 without sending any message (step S1003). After that, the VM 203a and the VM 203b end the process.

According to the process in FIG. 10, an identification number of an application for the VM thread 205a used by the VM 203a and an identification number of an application for the VM thread 205b used by the VM 203b are compared with each other. When the identification numbers of the two applications compared with each other are different, no message is sent between the VM 203a and the VM 203b. Thus, only when an identification number of an application for the VM thread 205a used by the VM 203a and an identification number of an application for the VM thread 205b used by the VM 203b are the same, a message is sent. As a result, every application is prevented from being executed without limitations based on sending of a message. Namely, execution of an application which is not desired to be executed is prevented.

Figure 11:
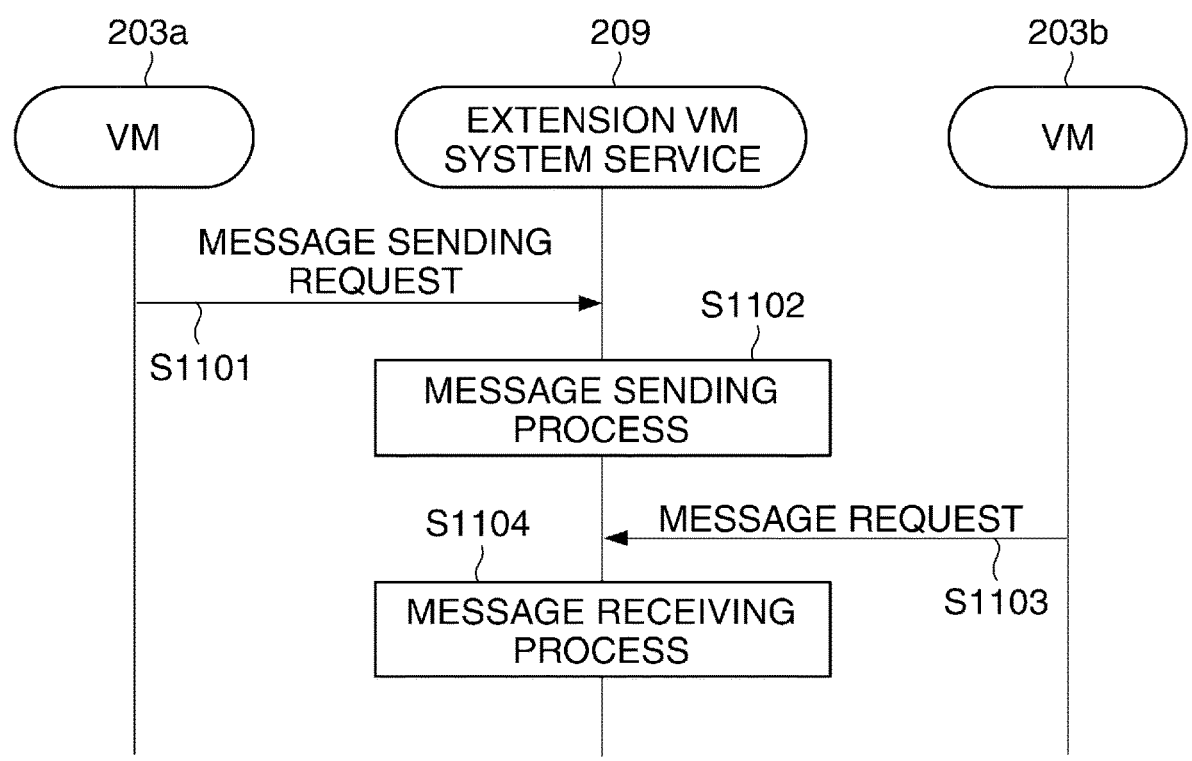
FIG. 11 is a diagram useful in explaining the flow of a process which is carried out among the VMs and an extension VM system service in step S1002 in FIG. 10.

FIG. 11 is a diagram useful in explaining a process which is carried out among the VMs and the extension VM system service in the step S1002 in FIG. 10. The process in FIG. 11 is carried out on the precondition that the message was sent in the step S802.

First, a message sending request is sent to the extension VM system service 209 so as to send a message from the VM 203a which is a sender (step S1101). At this time, the VM 203a sends a thread ID of the VM thread 205b used by the VM 203b, which is a destination, and a message desired to be sent (image data obtaining request) together to the extension VM system service 209. Next, upon receiving the message sending request, the extension VM system service 209 carries out the process in FIG. 10 (step S1102). Then, the VM 203b, which is the destination, sends a message request to the extension VM system service 209 so as to receive a message (step S1103). At this time, the VM 203b sends a thread ID of the VM thread 205b used by the VM 203b itself to the extension VM system service 209. The extension VM system service 209 obtains the thread ID of the VM thread 205b used by the VM 203b that has sent the message request, and based on the thread management information 400, checks the queue ID 403 corresponding to the obtained thread ID 402. The extension VM system service 209 then carries out a message receiving process in which it obtains a message stored in a queue with the checked queue ID 403 (step S1104).

FIG. 12 is a diagram useful in explaining the flow of a process in which an extension application stored in a host PC which is the external apparatus is installed onto the MFP.

First, a host PC 1200 sends an installation screen display request to the MFP 100 (step S1201). The MFP 100 receives the installation screen display request (step S1211) and also sends HTML contents for display on an installation screen (step S1212). The host PC 1200 displays the received HTML contents, which are for display on an installation screen, on a screen of a display unit which the host PC 1200 has (step S1202). Further, the host PC 1200 compresses an extension application, which is to be installed onto the MFP 100, and uploads the compressed extension application as an installation file to the MFP 100 (step S1203). The MFP 100 receives the uploaded installation file (step S1213) and also decompresses the compressed installation file (step S1214). The MFP 100 converts a program code of the decompressed installation file into a bytecode (step S1215) and starts writing the program code, which has been converted into the bytecode, in itself (step S1216). The MFP 100 then determines whether or not installation of the installation file has been completed (step S1217), and when the installation has been completed, the MFP 100 sends an installation completion notification to the host PC 1200 (step S1218). The host PC 1200 that has received the installation completion notification displays an installation completion screen on the screen of the display unit (step S1204). After that, the host PC 1200 and the MFP 100 end the process.

According to the process in FIG. 12, a program code of an installation file is converted into a bytecode, and the program code converted into the bytecode is written in the MFP 100. Namely, a program code of an installation file is converted into a bytecode which is a device-dependent code, and hence whatever device the program code is written in, the program code is converted into a code allowed to be written in the device. As a result, an extension application is allowed to be installed irrespective of an execution environment (device).

The present invention has been described by way of the embodiments, but the present invention is not limited to the embodiments described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable Instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (NPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 MFP
105 CPU
201 OS
203 VM
205 VM thread
206 VM system service
207 Extension application
400 Thread management information

The invention claimed is:

1. An information processing apparatus having a plurality of virtual machines including a first virtual machine that executes an application identified by first application identification information, a second virtual machine that executes the application identified by the first application identification information, and a third virtual machine that executes an application identified by second application identification information different from the first application identification information, the information processing apparatus comprising:
  a controller including a processor and a memory, the controller being configured to:
    generate a first thread to be used by the first virtual machine when the first virtual machine executes the application identified by the first application identification information, generate a second thread to be used by the second virtual machine when the second virtual machine executes the application identified by the first application identification information, and generate a third thread to be used by the third virtual machine when the third virtual machine executes the application identified by the second application identification information;

control to send a message from the first thread used by the first virtual machine that executes the application identified by the first application identification information to the second thread used by the second virtual machine that executes the application identified by the first application identification information; and restrict sending a message from the first thread used by the first virtual machine that executes the application identified by the first application identification information to the third thread used by the third virtual machine that executes the application identified by the second application identification information.

2. The information processing apparatus according to claim 1, wherein:

the controller is further configured to execute an operating system (OS) provided separately from the first virtual machine and the second virtual machine, and the first virtual machine requests generation of the second thread, and in response to the request to generate the second thread, the controller generates the second thread.

3. The information processing apparatus according to claim 1, wherein the controller is further configured to generate thread management information for use in managing at least one thread, wherein the thread management information has at least identification numbers corresponding to (i) the first application identification information and the first thread and (ii) the third application identification information and the third thread.

4. The information processing apparatus according to claim 3, wherein the identification numbers corresponding to the first application identification information and the third application identification information are different from each other.

5. The information processing apparatus according to claim 1, wherein the first virtual machine corresponding to the first thread is generated, and the first virtual machine interprets and executes a command included in an extension program.

6. The information processing apparatus according to claim 1, wherein the controller is further configured to:

generate a new thread according to a running of an extension program including a command that is interpreted and executed by the first virtual machine; and generate a new virtual machine which uses the generated new thread, wherein the second thread is generated as the new thread and the second virtual machine is generated as the new virtual machine.

7. The information processing apparatus according to claim 1, further comprising:

a display, wherein the controller is further configured to cause the display to indicate an error in the case where the controller restricts sending the message from the first thread used by the first virtual machine to the third thread used by the third virtual machine.

8. The information processing apparatus according to claim 1, wherein the message is a message to request an image data obtainment.

9. The information processing apparatus according to claim 1, wherein the message is a message to notify an image obtainment completion.

10. The information processing apparatus according to claim 1, wherein the controller generates the first thread to be used by the first virtual machine in response to (i) a native thread running on an operating system that controls the information processing apparatus being notified of an extension application starting request and (ii) a request to generate the first thread from the native thread.

11. A control method for an information processing apparatus having a plurality of virtual machines including a first virtual machine that executes an application identified by first application identification information, a second virtual machine that executes the application identified by the first application identification information, and a third virtual machine that executes an application identified by second application identification information different from the first application identification information, the control method comprising:

generating a first thread to be used by the first virtual machine when the first virtual machine executes the application identified by the first application identification information;

generating a second thread to be used by the second virtual machine when the second virtual machine executes the application identified by the first application identification information;

generating a third thread to be used by the third virtual machine when the third virtual machine executes the application identified by the second application identification information;

sending a message from the first thread used by the first virtual machine that executes the application identified by the first application identification information to the second thread used by the second virtual machine that executes the application identified by the first application identification information; and restricting sending a message from the first thread used by the first virtual machine that executes the application identified by the first application identification information to the third thread used by the third virtual machine that executes the application identified by the second application identification information.

12. The control method for an information processing apparatus according to claim 11, wherein the first virtual machine corresponding to the first thread is generated, and an extension program including a command that is interpreted and executed by the first virtual machine runs on the first virtual machine.

13. The control method for an information processing apparatus according to claim 11, further comprising:

generating a new thread according to a running of an extension program including a command that is interpreted and executed by the first virtual machine; and generating a new virtual machine which uses the generated new thread, wherein the second thread used by the second virtual machine is the generated new thread, and the second virtual machine is the generated new virtual machine.

14. The control method for an information processing apparatus according to claim 11, further comprising causing a display to indicate an error in the case where the message is restricted from being sent from the first thread used by the first virtual machine to the third thread used by the third virtual machine.

15. The control method for an information processing apparatus according to claim 11, wherein the message is a message to request an image data obtainment.

16. The control method for an information processing apparatus according to claim 11, wherein the message is a message to notify an image obtainment completion.

17. The control method for an information processing apparatus according to claim 11, wherein the first thread to be used by the first virtual machine is generated in response to (i) a native thread running on an operating system that controls the information processing apparatus being notified of an extension application starting request and (ii) a request to generate the first thread from the native thread.

18. An information processing apparatus having a plurality of virtual machines including a first virtual machine that executes an application identified by first application identification information, a second virtual machine that executes the application identified by the first application identification information, and a third virtual machine that executes an application identified by second application identification information different from the first application identification information, the information processing apparatus comprising:

a controller including a processor and a memory, the controller being configured to:

generate a first thread to be used by the first virtual machine when the first virtual machine executes the application identified by the first application identification information, generate a second thread to be used by the second virtual machine when the second virtual machine executes the application identified by the first application identification information, and generate a third thread to be used by the third virtual machine when the third virtual machine executes the application identified by the second application identification information;

control to send a message from the first virtual machine that executes the application identified by the first application identification information to the second virtual machine that executes the application identified by the first application identification information; and restrict sending a message from the first virtual machine that executes the application identified by the first application identification information to the third virtual machine that executes the application identified by the second application identification information.

19. A control method for an information processing apparatus having a plurality of virtual machines including a first virtual machine that executes an application identified by first application identification information, a second virtual machine that executes the application identified by the first application identification information, and a third virtual machine that executes an application identified by second application identification information different from the first application identification information, the control method comprising:

generating a first thread to be used by the first virtual machine when the first virtual machine executes the application identified by the first application identification information;

generating a second thread to be used by the second virtual machine when the second virtual machine executes the application identified by the first application identification information;

generating a third thread to be used by the third virtual machine when the third virtual machine executes the application identified by the second application identification information;

sending a message from the first virtual machine that executes the application identified by the first application identification information to the second virtual machine that executes the application identified by the first application identification information; and restricting sending a message from the first virtual machine that executes the application identified by the first application identification information to the third virtual machine that executes the application identified by the second application identification information.

\* \* \* \* \*